United States Patent
McGrath et al.

(10) Patent No.: US 9,058,198 B2
(45) Date of Patent: Jun. 16, 2015

(54) SYSTEM RESOURCE SHARING IN A MULTI-TENANT PLATFORM-AS-A-SERVICE ENVIRONMENT IN A CLOUD COMPUTING SYSTEM

(75) Inventors: Michael P. McGrath, Schaumburg, IL (US); Mark A. Lamourine, Billerica, MA (US)

(73) Assignee: Red Hat Inc., Raleigh, NC (US)

( * ) Notice: Subject to any disclaimer, the term of this patent is extended or adjusted under 35 U.S.C. 154(b) by 553 days.

(21) Appl. No.: 13/408,001

(22) Filed: Feb. 29, 2012

(65) Prior Publication Data

US 2013/0227560 A1 Aug. 29, 2013

(51) Int. Cl.
*G06F 9/46* (2006.01)
*G06F 9/455* (2006.01)
*H04L 29/04* (2006.01)
*G06F 9/50* (2006.01)

(52) U.S. Cl.
CPC ...... *G06F 9/45558* (2013.01); *G06F 2209/485* (2013.01); *G06F 9/5077* (2013.01); *G06F 2209/504* (2013.01); *G06F 9/5072* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 6,009,452 A | 12/1999 | Horvitz | |
| 7,774,761 B2 | 8/2010 | Vohra | |
| 7,853,708 B2 | 12/2010 | Townsley et al. | |
| 8,352,941 B1 | 1/2013 | Protopopov et al. | |
| 8,356,274 B2 | 1/2013 | Kwok et al. | |
| 8,505,006 B1 | 8/2013 | Larkin et al. | |
| 8,635,351 B2 | 1/2014 | Astete et al. | |
| 2002/0091753 A1 | 7/2002 | Reddy et al. | |
| 2005/0160428 A1* | 7/2005 | Ayachitula et al. | 718/104 |
| 2006/0277305 A1* | 12/2006 | Bernardin et al. | 709/226 |
| 2007/0128899 A1 | 6/2007 | Mayer | |
| 2008/0163004 A1 | 7/2008 | Yu | |
| 2008/0313639 A1* | 12/2008 | Kumar et al. | 718/104 |
| 2008/0320474 A1 | 12/2008 | Jelinek et al. | |
| 2009/0313374 A1 | 12/2009 | Murphy et al. | |
| 2009/0313620 A1* | 12/2009 | Sedukhin et al. | 718/1 |
| 2010/0122343 A1* | 5/2010 | Ghosh et al. | 726/23 |
| 2010/0153951 A1 | 6/2010 | Jones | |

(Continued)

OTHER PUBLICATIONS

Maoke Chen; Feather-Weight Network Namespace Isolation Based on User-Specific Addressing and Routing in Commodity OS;T. Magedanz et al. (Eds.): TridentCom 2010, LNICST 46, pp. 53-68, 2011.*

(Continued)

*Primary Examiner* — Abdullah Al Kawsar
(74) *Attorney, Agent, or Firm* — Lowenstein Sandler LLP

(57) ABSTRACT

A mechanism for system resource sharing in a multi-tenant PaaS environment in a cloud computing system is disclosed. A method of embodiments includes receiving, by a virtual machine (VM), identification of resource-usage groups that each define resource constraints to apply to applications having a type of the resource-usage group, establishing a resource control policy on the VM for each of the identified resource-usage groups, the resource control policy to enforce the resource constraints of its associated resource-usage group, configuring a plurality of resource control tools of the VM to implement each resource control policy, identifying a resource-usage group of an application to be created on the VM, applying, by the one or more resource control tools to the application, the resource control policy of the identified resource-usage group of the application, and executing the application with the defined resource constraints on the VM.

20 Claims, 6 Drawing Sheets

(56) References Cited

U.S. PATENT DOCUMENTS

| | | |
|---|---|---|
| 2010/0275241 A1 | 10/2010 | Srinivasan |
| 2011/0055310 A1 | 3/2011 | Shavlik et al. |
| 2011/0083131 A1* | 4/2011 | Pirzada et al. ............... 718/1 |
| 2011/0246617 A1 | 10/2011 | Sheehan et al. |
| 2011/0252320 A1 | 10/2011 | Arrasvuouri et al. |
| 2011/0276584 A1 | 11/2011 | Cotner et al. |
| 2011/0277027 A1 | 11/2011 | Hayton et al. |
| 2011/0302415 A1 | 12/2011 | Ahmad et al. |
| 2012/0004041 A1* | 1/2012 | Pereira et al. .............. 463/42 |
| 2012/0011077 A1 | 1/2012 | Bhagat |
| 2012/0096165 A1 | 4/2012 | Madduri et al. |
| 2012/0173581 A1* | 7/2012 | Hartig et al. .............. 707/781 |
| 2012/0174099 A1* | 7/2012 | Ashok et al. ................ 718/1 |
| 2012/0185913 A1 | 7/2012 | Martinez et al. |
| 2012/0215919 A1 | 8/2012 | Labat et al. |
| 2012/0246740 A1* | 9/2012 | Brooker et al. ............ 726/28 |
| 2013/0005487 A1* | 1/2013 | Frazzini et al. ............ 463/43 |
| 2013/0007239 A1 | 1/2013 | Agarwal et al. |
| 2013/0019243 A1* | 1/2013 | Schmidt et al. ............. 718/1 |
| 2013/0036208 A1* | 2/2013 | Dochez .................... 709/220 |
| 2013/0055243 A1* | 2/2013 | Dandekar et al. ........... 718/1 |
| 2013/0227560 A1 | 8/2013 | McGrath et al. |
| 2013/0227561 A1 | 8/2013 | Walsh et al. |
| 2013/0227563 A1 | 8/2013 | McGrath et al. |
| 2013/0227635 A1 | 8/2013 | Walsh et al. |
| 2013/0297672 A1 | 11/2013 | McGrath et al. |
| 2013/0297673 A1 | 11/2013 | McGrath et al. |
| 2013/0297685 A1 | 11/2013 | McGrath et al. |
| 2013/0297795 A1 | 11/2013 | McGrath et al. |
| 2013/0298183 A1 | 11/2013 | McGrath et al. |
| 2013/0305243 A1* | 11/2013 | Hiki ............................ 718/1 |
| 2014/0040883 A1* | 2/2014 | Tompkins ................... 718/1 |

OTHER PUBLICATIONS

An Qin; XConveryer: Guarantee Hadoop Throughput via Lightweight OS-level Virtualization; 2009 Eighth International Conference on Grid and Cooperative Computing, IEEE 2009, pp. 299-304.*

Anup K. Ghosh; DARPA Mobivisor: An Architecture for High Assurance for Untrusted Applications on Wireless Handheld Devices Via Lightweight Virtualization; Nov. 2010; 28 pages.*

USPTO, Office Action for U.S. Appl. No. 13/461,705, mailed Jan. 30, 2014.

USPTO, Office Action for U.S. Appl. No. 13/461,712 mailed Feb. 27, 2014.

USPTO, Office Action for U.S. Appl. No. 13/461,712 mailed Jun. 20, 2014.

USPTO, Office Action for U.S. Appl. No. 13/408,754 mailed Jan. 16, 2014.

USTPO, Final Office Action for U.S. Appl. No. 13/408,754 mailed Jun. 4, 2014.

USPTO, Notice of Allowance for U.S. Appl. No. 13/461,584 mailed Jan. 29, 2014.

USPTO, Notice of Allowance for U.S. Appl. No. 13/461,584 mailed May 22, 2014.

USPTO, Office Action for U.S. Appl. No. 13/408,676 mailed Feb. 27, 2014.

USPTO, Office Action for U.S. Appl. No. 13/461,722 mailed Sep. 20, 2013.

USPTO, Final Office Action for U.S. Appl. No. 13/461,722 mailed Apr. 15, 2014.

Corcoran et al. Cross-Tier, Label-based Secuirty Enforcement for Web Applications. 2009. ACM. pp. 269-281.

Loscocco et al. Meeting Critical Security Objectives with Security-Enhanced Linux. 2001. NSA. pp. 1-11.

Morris, James. File System Labeling in SELinux. 2004. RedHat. pp. 1-8.

Red Hat Inc., Red Hat Enterpise Linux 5 Deployment guide, "Deployment, configuration and administration of Red Hat Enterprise Linux 5", Chapter 46—Security and SELinux, pp. 823-848, 26 pages, Jul. 21, 2011.

Smalley, Stephen D. SELinux. 2001.NSA. pp. 1-23.

Unix man unshare clone Janak Desai, Jan. 11, 2006; p. 1-5.

USPTO, Final Office Action for U.S. Appl. No. 13/461,705 mailed Aug. 7, 2014.

USPTO, Advisory Action for U.S. Appl. No. 13/408,754 mailed Aug. 11, 2014.

USPTO, Office Action for U.S. Appl. No. 13/408,729 mailed Mar. 12, 2014.

USPTO, Notice of Allowance for U.S. Appl. No. 13/408,729 mailed Sep. 29, 2014.

USPTO, Office Action for U.S. Appl. No. 13/461,715 mailed Jul. 23, 2014.

USPTO, Notice of Allowance for U.S. Appl. No. 13/408,676 mailed Oct. 7, 2014.

Authors et al., "Apparatus and Method of Tenant Context Generation and Propagation in SaaS Environment," Aug. 19, 2010, IP.com. pp. 1-4.

* cited by examiner

500

Receive request from server orchestration system to create a new application
510

Determine resource-usage group type of the application
520

Based on determined resource-usage group type, identify resource control policy associated with the determined resource-usage type
530

Implement resource control for the application with one or more resource control tools of the node, each of the one or more resource control tools implementing a portion of the identified resource control policy associated with the resource-usage group of the application
540

Confirm setup of the application, including resource controls for the application, and provide address for application to server orchestration system
550

*Fig. 5*

SYSTEM RESOURCE SHARING IN A MULTI-TENANT PLATFORM-AS-A-SERVICE ENVIRONMENT IN A CLOUD COMPUTING SYSTEM

CROSS-REFERENCE TO RELATED APPLICATIONS

The present application is related to co-filed U.S. patent application Ser. No. 13/408,754 entitled "Mechanism for Creating and Maintaining Multi-Tenant Applications in a Platform-as-a-Service (PaaS) Environment of a Cloud Computing System"; co-filed U.S. patent application Ser. No. 13/408,729 entitled "Mechanism for Applying Security Category Labels to Multi-Tenant Applications of a Node in a Platform-as-a-Service (PaaS) Environment"; and co-filed U.S. patent application Ser. No. 13/408,676 entitled "Mechanism for Applying a Custom Security Type Label to Multi-Tenant Applications of a Node in a Platform-as-a-Service (PaaS) Environment"; which are all assigned to the assignee of the present application.

TECHNICAL FIELD

The embodiments of the invention relate generally to platform-as-a-service (PaaS) environments and, more specifically, relate to a mechanism for system resource sharing in a multi-tenant PaaS environment in a cloud computing system.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system. Customers that have installed and are executing their programs "in the cloud" typically communicate with the executing program from remote geographic locations using Internet protocols.

For programs that are web applications, the additional software can further include such software components as middleware and a framework. Web applications are programs that receive and act on requests in web or other Internet protocols, such as HTTP. It is common for a user to use a web application by using a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically must identify all of the software components that a web application needs in order to execute, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested to execute the web application instead or in addition on a different hypervisor and/or in a different particular provider's cloud. Also, it can be difficult to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings. PaaS offerings typically facilitate deployment of applications without the cost and complexity of buying and managing the underlying hardware and software and provisioning hosting capabilities, providing all of the facilities required to support the complete life cycle of building and delivering web application and service entirely available from the Internet. Typically, these facilities operate as one or more virtual machines (VMs) running on top of a hypervisor in a host server.

In present PaaS offerings, a first customer's deployed applications do not co-exist with any other customer's deployed applications on the VMs that are hosting the first customer's deployed applications. However, such an arrangement can be inefficient to the PaaS provider offering the platform services. This is because the applications being deployed in the PaaS are generally quite small packages, and the size of the VM does not correspond to the size of the application. It can be costly to initialize a new VM for each application deployment, and it may also be a waste of resources that are not being utilized. In a public cloud environment, a PaaS provider pays for deploying a VM whether the VM lies idle or not. In a private cloud environment, there is still a strain on resources for running VMs that are not completely utilized.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 5 is a flow diagram illustrating a method for applying resource control policies to multi-tenant applications executing on a node in a PaaS system according to an embodiment of the invention.

DETAILED DESCRIPTION

Figure 1:
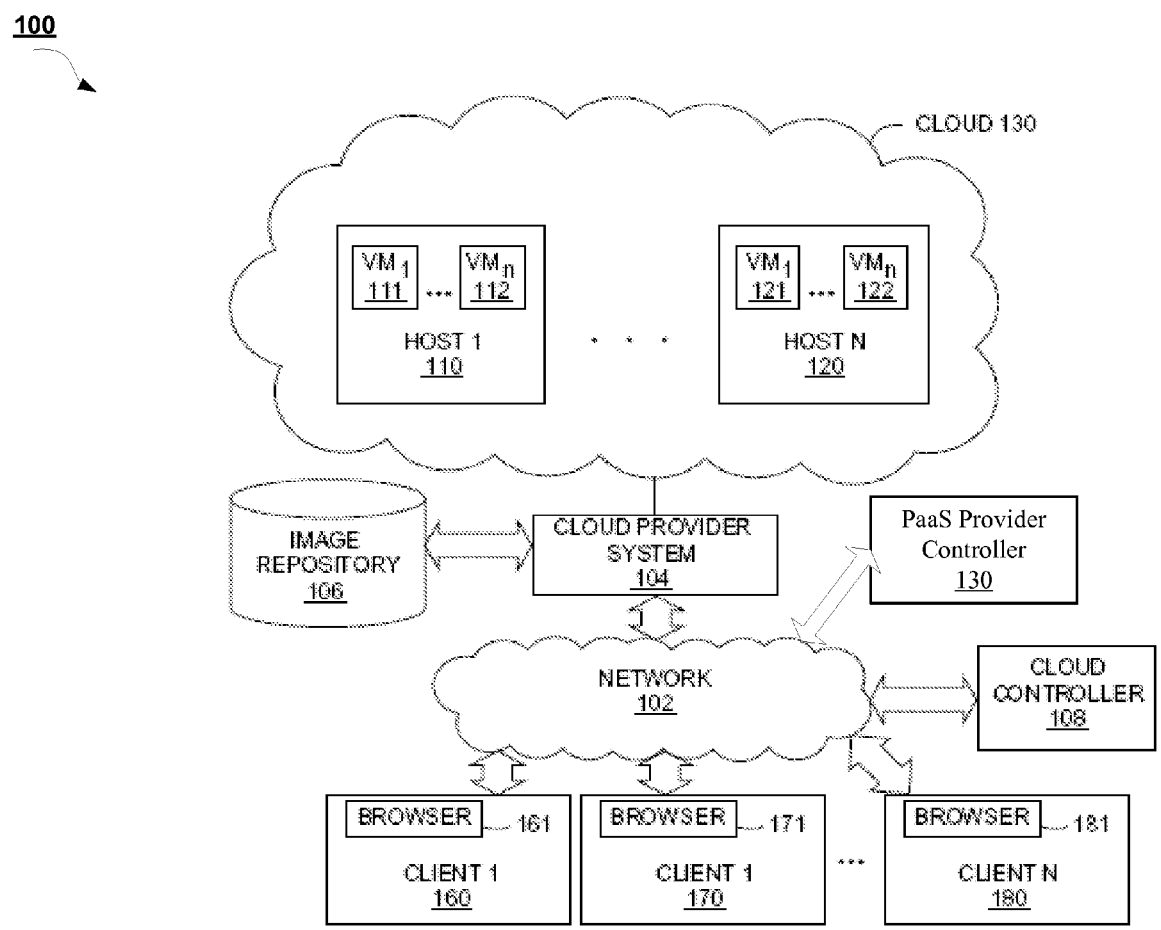
FIG. 1 is a block diagram of a network architecture in which embodiments of the invention may operate.

Embodiments of the invention provide a mechanism for system resource sharing in a multi-tenant Platform-as-a-Service (PaaS) environment in a cloud computing system. A method of embodiments of the invention includes receiving, by a virtual machine (VM), identification of resource-usage groups that each define resource constraints to apply to applications having a type of the resource-usage group, establishing a resource control policy on the VM for each of the identified resource-usage groups, the resource control policy to enforce the resource constraints of its associated resource-usage group, configuring a plurality of resource control tools of the VM to implement each resource control policy, identifying a resource-usage group of an application to be created on the VM, applying, by the one or more resource control tools to the application, the resource control policy of the identified resource-usage group of the application, and executing the application with the defined resource constraints on the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing", "applying", "identifying", "configuring", "establishing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for system resource sharing in a multi-tenant PaaS environment in a cloud computing system. In the multi-tenant PaaS environment, each node (i.e., virtual machine (VM)) in the PaaS environment runs multiple applications, and, as such, shares its resources between these applications. To enable this resource sharing, each node/VM is set up to utilize multiple resource control tools as one coherent restriction on applications running on the node. In one embodiment, each node/VM is categorized to provide resources for applications falling into a particular resource-usage group. Subsequently, the various resource control tools of the node are programmed to implement the resource restrictions for any applications starting and running on the node in a uniform manner. This allows the resources of a single node/VM to be subdivided for use by many applications simultaneously in embodiments of the invention.

FIG. 1 is a block diagram of a network architecture 100 in which embodiments of the invention may operate. The network architecture 100 includes a cloud 130 managed by a cloud provider system 104. The cloud 130 provides VMs, such as VMs 111, 112, 121, and 122. Each VM is hosted on a physical machine, such as host 1 110 through host N 120, configured as part of the cloud 130. In some embodiments, the host machines 110, 120 are often located in a data center. For example, virtual machines 111 and 112 are hosted on physical machine 110 in cloud 130 provided by cloud provider 104. Users can interact with applications executing on the cloud-based VMs 112, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 130. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, 122. The command may be received from the cloud controller 108, from a PaaS Provider Controller 130, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
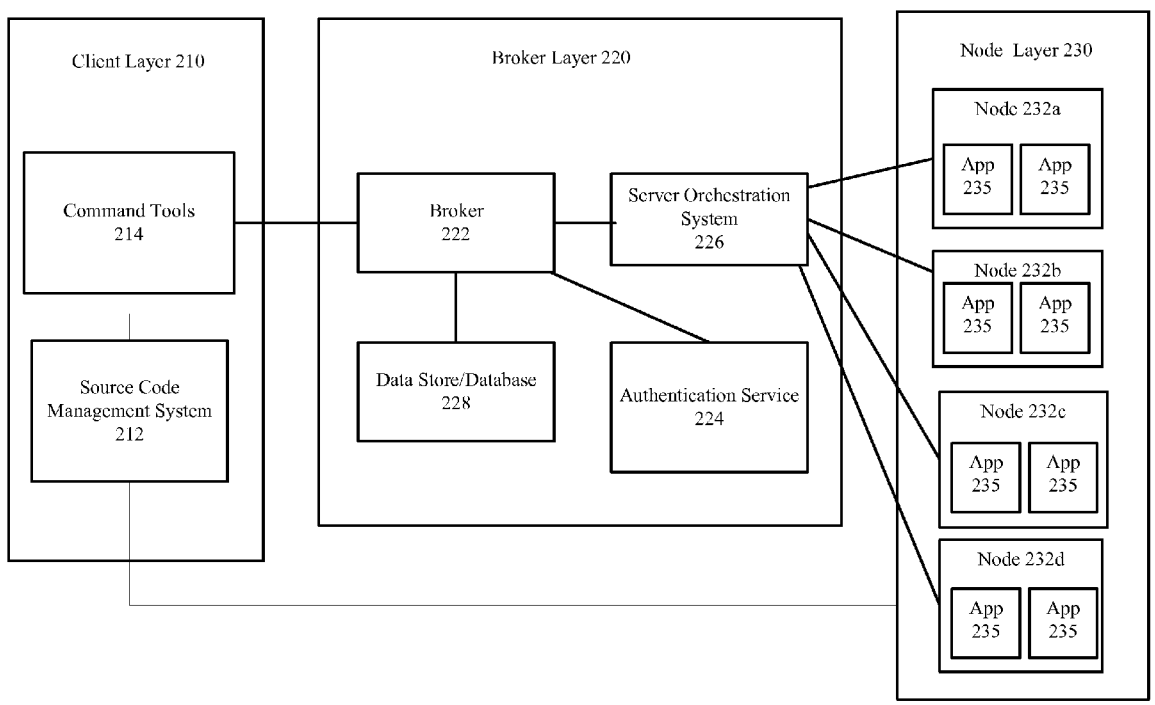
FIG. 2 is a block diagram of a PaaS system architecture according to an embodiment of the invention.

FIG. 2 is a block diagram of a PaaS system architecture 200. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232 on which software applications 235 are provisioned and executed. In one embodiment, each node 232 is a VM provisioned by an Infrastructure as a Service (IaaS) provider, such as Amazon™ Web Services. In other embodiments, the nodes 232 may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235, or some other action to manage the application 235, the broker 222 first authenticates the user using an authentication service 224. In one embodiment, the authentication service may comprise Streamline™, or may comprise some other authentication tool. Once the user has been authenticated and allowed access to the system by authentication service 224, the broker 222 uses a server orchestration system 226 to collect information and configuration information about the nodes 232.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232, which are acting as application servers and web servers.

For example, if the broker 222 wanted to shut down all applications 235 on all even numbered nodes out of 100,000 nodes, the broker 222 would only need to provide one command to the server orchestration system 226. Then, the server orchestration system 226 would generate a separate message to all nodes 232 to shut down all applications 235 if the node 232 is even, and distribute the messages to the nodes 232 using a messaging and queuing system. Thus, in one embodiment, the broker 222 manages the business logic and model representing the nodes 232 and the applications 235 residing on the nodes, and acts as a controller that generates the actions requested by users via an API of the client tools 214. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally-hosted database or file store, or it can be a cloud based storage service provided by a Storage-as-a-Service (SaaS) storage provider, such as Amazon™ S3™ (Simple Storage Service). The broker 22 uses the information about the nodes 232 and their applications 235 to model the application hosting service and to maintain records about the nodes. In one embodiment, node 232 data is stored in the form of a JavaScript Object Notation (JSON) blob or string that maintains key-value pairs to associate a unique identifier, a hostname, a list of applications, and other such attributes with the node.

In embodiments of the invention, the PaaS system architecture 200 of FIG. 2 is a multi-tenant PaaS environment. In a multi-tenant PaaS environment, each node 232 runs multiple applications 235 that may be owned or managed by different users and/or organizations. As such, a first customer's deployed applications 235 may co-exist with any other customer's deployed applications on the same node 232 (VM) that is hosting the first customer's deployed applications 235. This deployment of multiple applications 235 of multiple customers on a single node 232 (VM) is a cost-efficient solution for PaaS providers. However, deploying a multi-tenant PaaS solution raises a variety of concerns, including, for example, efficient resource sharing on the node's 232 limited resources between the applications 235 hosted on the node 232 and security between the applications hosted on the node 232.

Embodiments of the invention provide for efficient resource sharing between applications 235 hosted on a multi-tenant node 232 by setting up each node 232 to utilize multiple resource control tools as a single coherent restriction on applications 235 running on the node 232. One embodiment of the interaction between the server orchestration system 226 and a node 232 to implement efficient resource sharing for multi-tenant applications is now described in more detail with reference to FIG. 3.

Figure 3:
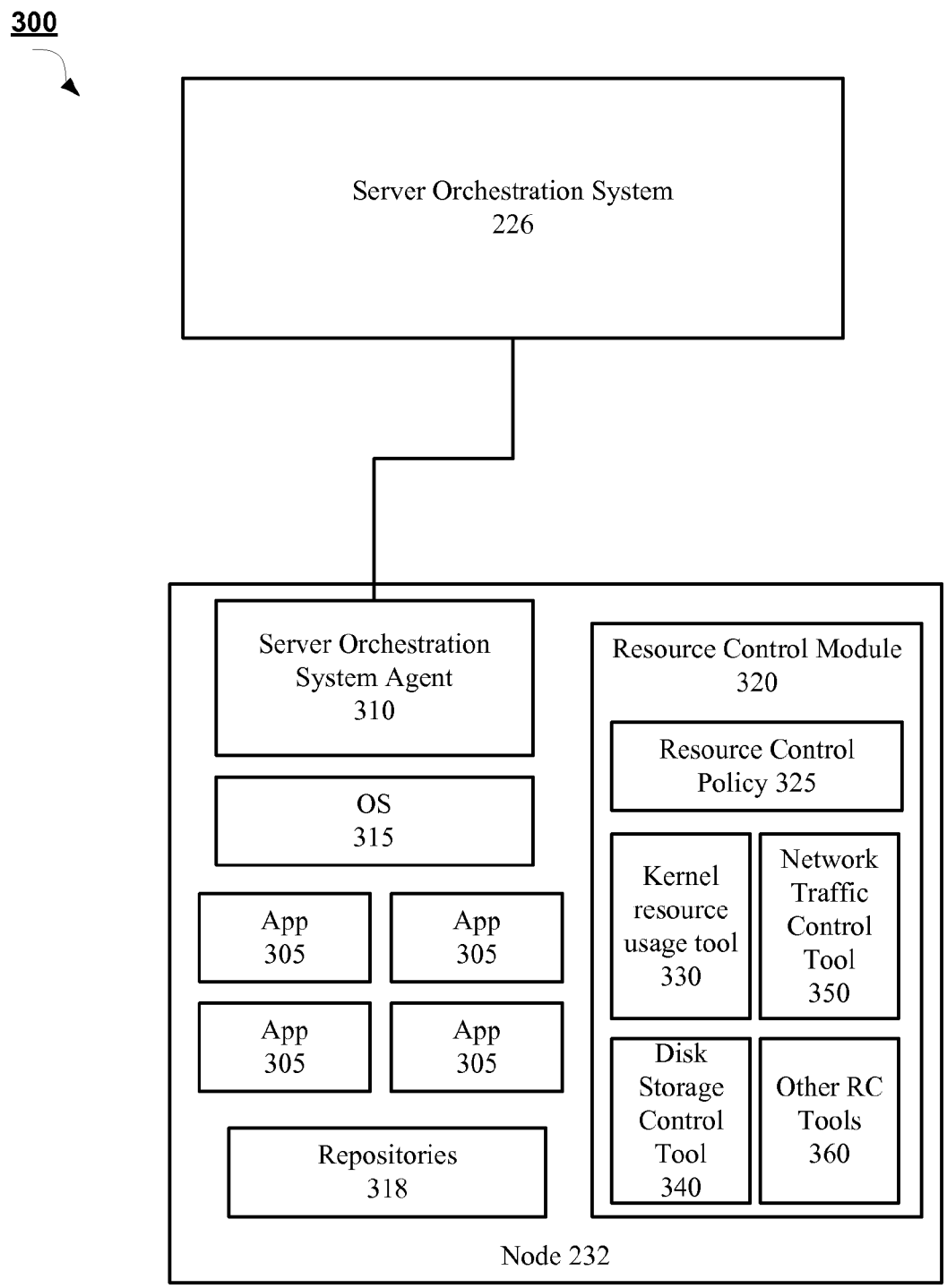
FIG. 3 is a block diagram of a communication infrastructure between a server orchestration system and a node according to embodiments of the invention.

FIG. 3 is a block diagram depicting a communication infrastructure 300 between a server orchestration system 225 and a node 232 according to embodiments of the invention. In one embodiment, server orchestration system 226 and node 232 are the same as their counterparts described with respect to FIG. 2. In one embodiment, node 232, which is implemented as a VM, has an operating system 315 that can execute applications 305 in the various software repositories 318 resident on the node 232. In one embodiment, applications 232 are the same as applications 235 described with respect to FIG. 2.

The node 232 also include a server orchestration system agent 310 configured to track and collect information about the node 232 and to perform actions on the node 232. Thus, in one embodiment, using MCollective™ as the server orchestration system 226, the server orchestration system agent 310 can be implemented as a MCollective™ server. The server orchestration system 226 would then be the MCollective™ client that can send requests, queries, and commands to the MCollective™ server on node 232.

In one embodiment, server orchestration system 226 categorizes applications 305 into defined resource-usage groups. A resource-usage group defines the amount of resources (e.g., CPU, memory, storage, disk I/O, network I/O, etc.) that an application 305 is allotted when executing on a node 232. In one embodiment, each node 232 is configured to host applications 305 from a single resource-usage group. In other embodiments, a node 232 may be configured to host applications 305 from more than one resource-usage group. However, for efficiency purposes and ease of configuration, a node 232 generally hosts applications 305 from one or a small number of resource-usage groups. In some embodiments, the resource-usage group type of an application is determined based on the platform that a customer requests for their application or based on a service-level agreement associated with the customer.

When a server orchestration system 226 is initially configuring a new node 232, with no applications running on the node 232, one or more resource control tools are setup and configured on the node 232. In one embodiment, the resource control tools include, but are not limited to, a kernel resource usage tool 330, a disk storage control tool 340, a network traffic control tool 350, and any other resource control tools 360 for controlling node resources.

In one embodiment, the kernel resource usage tool is Linux™ control groups (cgroups), the disk storage control tool 340 is Linux™ Disk Quota, and the network traffic control tool 350 is Linux™ Traffic Control (tc). Cgroups is a Linux kernel feature that creates collections of processes (e.g., applications) that are bound by the same criteria, such as constraining CPU usage, memory allocation, and disk I/O bandwidth of each process in the collection. The application groupings provided by cgroups can then be used by subsystems of the OS 315 to constrain the CPU, memory, and disk I/O of each of the processes according to the configuration of the particular cgroup. Examples of these subsystems include various drivers associated with the resources.

Disk Quotas is a Linux™ feature that allows a maximum amount of disk space to be allocated to a user of a group. Disk Quotas defines the maximum number of blocs and/or inodes that can have a single UID value within a controlled file system. Because each application (process) is associated with a unique UID, and because an application (process) can only create and write new files that have the same "ownership" or "group" as denoted by the UID on the files, this effectively places a limit on the size of the file space owned by the UID account (e.g., application).

Tc is a Linux™ kernel feature that encompasses the set of tools for managing network I/O bandwidth of processes on a network interface. In one embodiment, another resource control tool 360 may be Linux™ Pluggable Authentication Module (PAM) limits module. PAM limits is a PAM module that sets limits on system resources that can be obtained during a "user" session. In this context, "user" refers to the user of the local user ID (UID) assigned to an application. In one embodiment, the PAM limits module sets hard upper limits to the number of processes that an application can have at any one time. The limits apply to all processes owned by the application. Some other limits set by the PAM limits module may relate to aggregate usage (e.g., number of processes), while others may apply to individual processes (e.g., max memory, max file size, etc.).

In one embodiment, server orchestration system 226 also creates a resource control module 320 on the node 232 to implement a resource control policy 325 for the node 232. In some embodiments, the resource control module 320 is implemented as software on node 232 that includes instructions to apply the resource control policy 325 to applications 305. The resource control policy 325 provides the overriding framework for the resource control tools 330-360 to follow in order to implement resource controls (e.g., cgroups constraining CPU, memory, and disk I/O of the application, Disk Quota confining the disk space for the application, tc managing transmission of packets for the application, PAM limits setting limits on process resources, etc.) for an application 305 assigned to a particular resource-usage group. The resource control policy 325 programs the various disparate resource control tools 330-360 to act as a single unit in order to implement the resource controls for applications 305 starting and running on the node 232 in a uniform manner.

In one embodiment, the resource control module 320 may receive data, at initialization of the node 232 or during some other update to node 232, from server orchestration system 226 regarding the various resource-usage groups of applications and their associated resource limitations. For example, server orchestration system 226 may inform control module 320 that node 232 will host applications implemented on a JBoss™ platform. As part of the configuration settings of the PaaS system, all JBoss platform applications may have been assigned a set of resource controls, such as a specific share allocation of CPU usage, memory allotment, share allocation of disk I/O bandwidth, and a share allocation of networking I/O bandwidth. This set of resource controls is delineated in a single resource control policy, which is also provided to node 232 by server orchestration system 226.

Then, the resource control module 320 correspondingly directs the resource control tools 330-360 to create the control groups or file system partitions that implement the resource controls for an application of a particular resource-usage group. As mentioned above, when a node 232 is initialized to host applications of a single type of resource-usage group, the resource control tools 330-360 are correspondingly configured to implement the resource control policies of that resource-usage group to the entire node 232. However, if a node 232 is initialized to host applications from more than one type of resource-usage group, then the resource control tools 330-360 are correspondingly configured to implement a variety of different resource control policies for the node 232, and will accordingly create multiple different control groups or partitions to enable these multiple different resource control policies.

For example, cgroups creates configuration information for control groups that are bound by the same criteria (e.g., a specific share of CPU processing time, a specific memory space allotment, a specific share of disk I/O bandwidth, a specific disk storage limits, and a specific share of networking I/O bandwidth). As such, cgroups may create multiple different process collections (e.g., control groups) that are each configured with resource constraints in accordance with the resource policy of the resource-usage group. When a new application joins the node, the process of the application can be assigned its own control group that is bound by the resource limitations defined in the configuration information for the resource-usage group that the application falls under. In another example, disk quotas may be pre-configured for applications of each resource-usage group by creating the different file locations that are controlled by disk quotas. Once a new application joins the node, it can be assigned to a file location that was pre-configured for an application of the resource-usage group.

In one embodiment, the resource control module 320 communicates with OS 315 in order to direct any kernel-level resource control tools 330-360. In some embodiments, the resource control policy 325 may include a mapping of resource-usage group types to control groups or partitions, which are managed by resource control tools 330-360, that implement the necessary resource limitations for an application of each resource-usage group type.

Once a node 232 has been configured for resource control of applications 305, the server orchestration system agent 310 waits for commands from the server orchestration system 226, such as a command to start a new application. As part of the process for launching a new application on node 232, server orchestration system agent 310 interacts with resource control module 320 to implement resource control policies 325 on the new application according to the resource-usage group that the application is part of. When the server orchestration system 226 makes a call to the server orchestration system agent 310 to start an application, the server orchestration system agent 310 determines the resource-usage group type of the application. In one embodiment, the type may be explicitly provided as data to the server orchestration system agent 310 as part of the start new application command. In other embodiments, the server orchestration system agent 310 may implicit determine the resource-usage group type based on other identifying information of the application (e.g., a platform of the application).

Based on the determined resource-usage group type of the application, the resource control module 320 accesses the resource control policy 325 associated with the particular type and directs the resource control tools 330-360 to implement their associated policies to enforce the resource constraints for the application according to its resource-usage group type. Then, throughout the lifetime of the application 305 on the node 232, the resource constraints are consistently enforced. As a result, the resources of the single node (VM) 232 can be subdivided for use by many multi-tenant applications 305 simultaneously in embodiments of the invention.

Figure 4:
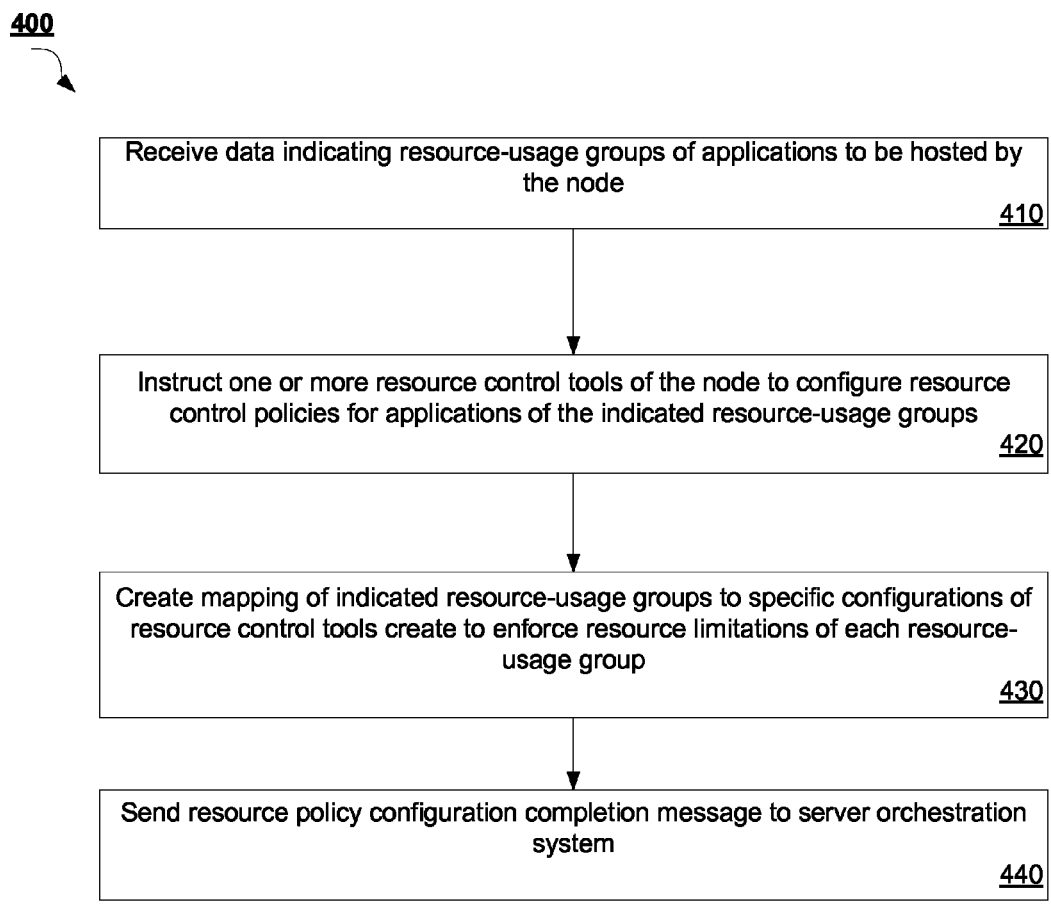
FIG. 4 is a flow diagram illustrating a method for initializing a node with resource control policies for applications hosted by the node in a PaaS system according to an embodiment of the invention.

FIG. 4 is a flow diagram illustrating a method 400 for initializing a node with resource control policies for applications hosted by the node in a PaaS system according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a node/VM executing on a computing device, such as node 232 described with respect to FIGS. 2 and 3.

Method 400 begins at block 410 where, as part of initialization of a node (VM), data is received by the node that indicates one or more resource-usage groups of applications that will be hosted by the node. A resource-usage group defines the amount of resources (e.g., CPU, memory, storage, disk I/O, network I/O, etc.) that an application is allotted when executing on the node. In one embodiment, the resource usage groups, and the corresponding applications that the groups apply to, are defined and configured by an administrator of the PaaS system on the broker layer. The resource-usage group policies are then pushed down from the server orchestration system at the broker layer to the individual nodes for implementation. In one embodiment, the node is configured to host applications from a single resource-usage group. In other embodiments, a node is configured to host applications from more than one resource-usage group.

Then, at block 420, the node instructs one or more resource control tools of the node to configure resource control policies based on configuration settings provided to the node from a server orchestration system of a broker layer of the PaaS system. These resource control policies are applied to applications grouped under the indicated resource-usage groups. Each resource control policy of the node provides a framework for the resource control tools to follow in order to implement resource control for an application assigned to a particular resource-usage group. The resource control policy programs the various disparate resource control tools to act as a single unit in order to implement the resource restrictions for applications starting and running on the node in accordance with their associated resource-usage group In one embodiment, the resource control tools comprise a kernel resource usage tool, a disk storage control tool, a network traffic control tool, and any other resource control tools known to one skilled in the art. For example, the kernel resource usage tool is Linux™ cgroups, the disk storage control tool is Linux™ Disk Quota, and the network traffic control tool is Linux™ tc. Cgroups creates create multiple different process collections (e.g., control groups) that are each configured with resource limitations in accordance with the resource limitations assigned to resource-usage group. Disk quotas creates different file locations on the disk of the node that are controlled by disk quotas of a corresponding resource-usage group. Tc creates custom configurations to control network traffic of applications corresponding to each resource-usage group.

Subsequently, at block 430, a mapping is created, based on the provided configuration settings from the server orchestration system, of the indicated resource-usage groups to the specific configurations implemented by each of the resource control tools to enforce the resource limitations of each resource-usage group is created. In one embodiment, this mapping is stored with the resource control policies implemented by the node. Lastly, at block 440, a resource policy configuration completion message is sent to the server orchestration system to inform the server orchestration that the resource configuration has finished at the node and that the node is ready to receive applications on which to apply these resource control policies.

FIG. 5 is a flow diagram illustrating a method 500 for applying resource control policies to multi-tenant applications executing on a node in a PaaS system according to an embodiment of the invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by a node/VM executing on a computing device, such as node 232 described with respect to FIGS. 2 and 3.

Method 500 begins at block 510 where a request is received at the node from a server orchestration system of a broker layer of the PaaS system. In one embodiment, the request is to create a new application on the node. The request includes identifying information about the application to be set up. For example, the information may include one or more file repositories stored on the node to be utilized to initialize the application. At block 520, a resource-usage group type of the application is determined. In one embodiment, the resource-usage group type is included in the identifying information about the application sent from the server orchestration system. In another embodiment, the resource-usage group type is implicitly determined from the identifying information sent from the server orchestration system (e.g., from the platform of the application, etc.).

At block 530, based on the determined resource-usage group type, the node identifies a resource control policy associated with the determined resource-usage group type of the application. In one embodiment, the resource control policy is maintained by a resource control module of the node. In addition, the resource control module maintains information regarding the specific resource limitations associated with the resource-usage group of the node, and a mapping of the resource configuration policies that one or more resource control tools of the node implement to the enforce the resource control policy for the resource-usage group of the application.

Then, at block 540, the identified resource control policy for the application is implemented by the one or more resource control tools of the node identified by the resource control module. In one embodiment, the one or more resource control tools implement resource configuration policies as indicated in the mapping to the application's resource-usage group maintained by the resource control module. In one exemplary embodiment, a new local UNIX user is created on the node to represent the new application. Then, files to allow the application to run are collected and placed on a preconfigured location of the node's file system to be controlled by Disk Quota in accordance with the resource control policy for the resource-usage group of the application. When the application starts, an ID of the process of the application is placed into a cgroup established for the application that implements resource control according to the resource control policy for the resource-usage group of the application. In addition, resource control policies are applied to the application by Linux™ tc based on the cgroup that the application was placed.

Once the node completes setup (including resource control policy setup) of the application, an application setup complete confirmation message is sent to the server orchestration system at block 550. The setup complete confirmation message also includes an address, such as an HTML address, established for the application. The server orchestration system determines an end user associated with the application and provides the address to the end user. Subsequently, the end user may then directly access the application on the node without requiring the broker to act as an intermediary.

Figure 6:
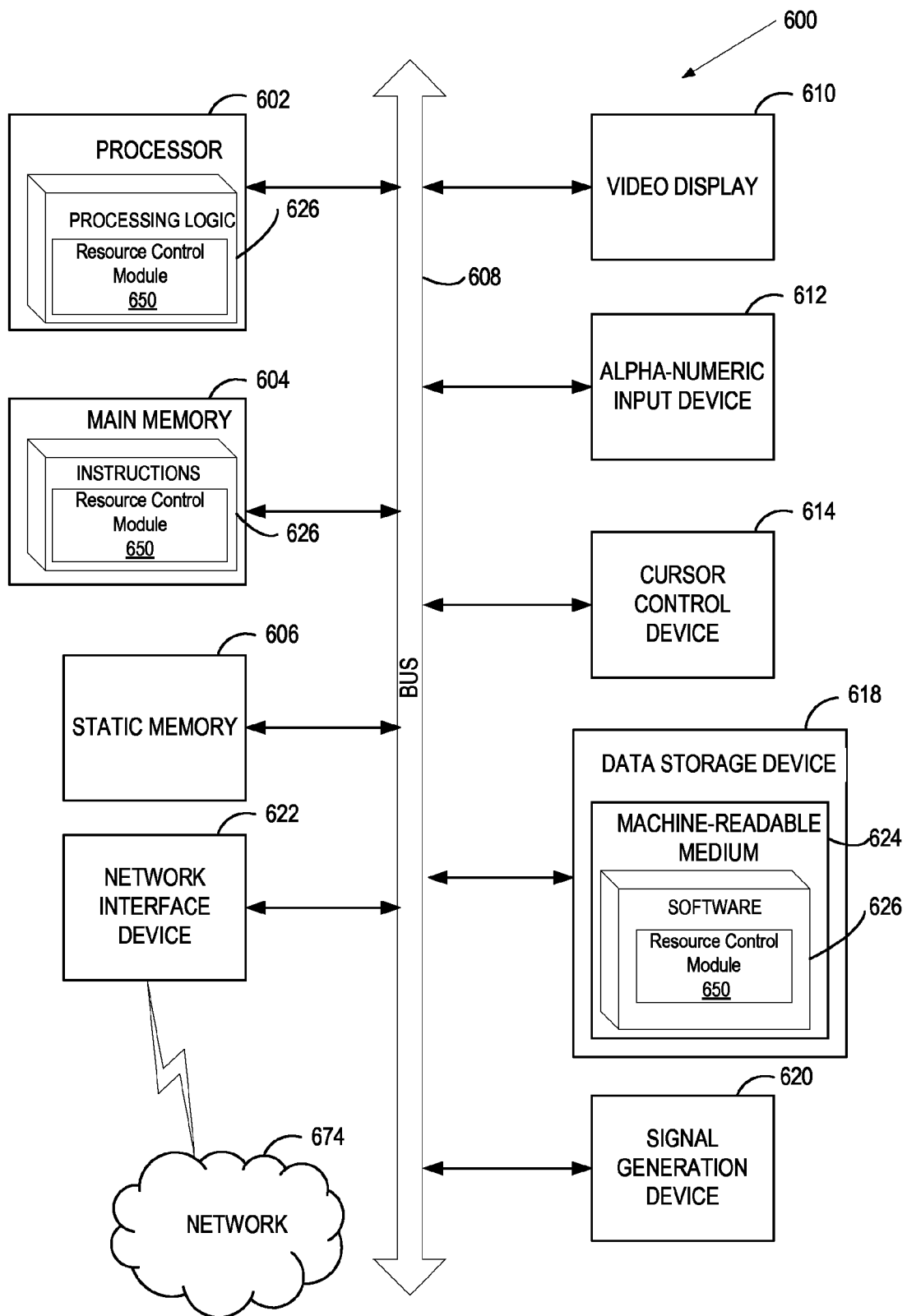
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein, illustrated in FIG. 6 by depicting instructions 626 within processor 602.

The computer system 600 may further include a network interface device 622. The computer system 600 also may include a video display unit 610 (e.g., a liquid crystal display (LCD), a cathode ray tube (CRT), or a touchscreen), an alphanumeric input device 612 (e.g., a keyboard), a cursor control device 614 (e.g., a mouse), and a signal generation device 620 (e.g., a speaker).

The data storage device 618 may include a machine-readable storage medium 624 (also known as a computer-readable storage medium) on which is stored software 626 (e.g., one or more sets of instructions, software, etc.) embodying any one or more of the methodologies or functions described herein. The software 626 may also reside, completely or at least partially, within the main memory 604 (e.g., instructions 626) and/or within the processor 602 (e.g., processing logic 626) during execution thereof by the computer system 600, the main memory 604 and the processor 602 also constituting machine-readable storage media. The software 626 may further be transmitted or received over a network 674 via the network interface device 622.

In one embodiment, the software 626 include instructions for a resource control module 650, which may correspond to resource control module 320 of FIG. 3, and/or a software library containing methods that call the resource control module for system resource sharing in a multi-tenant PaaS environment in a cloud computing system. While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   receiving, by a virtual machine (VM) executed by a processing device, identification of resource-usage groups that each define resource constraints to apply to applications;
   establishing a resource control policy on the VM for each of the identified resource-usage groups, the resource control policy to enforce the resource constraints of its associated resource-usage group;
   for each established resource control policy, configuring resource control tools of the VM to implement the resource control policy;
   receiving, by the VM, a request to initialize an application on the VM, the request comprising identifying information about the application;
   identifying, by the VM in view of the identifying information, a resource-usage group of the resource-usage groups that the application is assigned;
   applying, by the resource control tools to the application, the resource control policy of the identified resource-usage group that the application is assigned; and
   executing the application with the defined resource constraints, which correspond to the identified resource-usage group that the application is assigned, applied to the VM, the application executed on the VM with other applications having different owners than an owner of the application.

2. The method of claim 1, wherein the resources comprise at least one of CPU, memory, disk I/O, or network I/O.

3. The method of claim 1, wherein the plurality of resource control tools comprise at least one of a kernel resource usage tool, a disk storage control tool, or a network traffic control tool.

4. The method of claim 3, wherein the kernel resource usage tool is Linux™ Control Groups (cgroups), the disk storage control tool is Linux™ Disk Quota, or the network traffic control tool is Linux™ Traffic Control (tc).

5. The method of claim 4, wherein applying the resource control policy of the identified resource-usage group of the application further comprises:
   placing files of the application in a specified location of a file system of the VM, the specified location configured by Disk Quota to control disk space of the application according to the resource constraints of the resource-usage group of the application; and
   placing an ID of a process of the application into a cgroup established for the application that implements the resource constraints of the resource-usage group of the application.

6. The method of claim 1, further comprising, for each of the resource-usage groups, creating a mapping in the VM of the resource-usage group to configurations of the one or more resource control tools that implement the resource control policy of the resource-usage group.

7. The method of claim 1, wherein the VM is configured to host applications of one resource-usage group of the resource-usage groups.

8. The method of claim 1, wherein the identifying the resource-usage group of the application further comprises:
   receiving a request to create the application from a server orchestration system; and
   determining the resource-usage group of the application based on identifying information of the application included in the request.

9. The method of claim 8, wherein the server orchestration system operates on a broker layer of a Platform-as-a-Service (PaaS) system that includes the VM, the PaaS system implemented in a cloud computing system.

10. A system, comprising:
    a memory;
    a processing device communicably coupled to the memory; and
    a virtual machine (VM) to virtualize resources of the memory and the processing device, the VM to:
       receive identification of resource-usage groups that each define resource constraints to apply to applications;
       establish a resource control policy on the VM for each of the identified resource-usage groups, the resource control policy to enforce the resource constraints of its associated resource-usage group;
       for each established resource control policy, configure resource control tools of the VM to implement the resource control policy;
       receive request to initialize an application on the VM, the request comprising identifying information about the application;
       identify, in view of the identifying information, a resource-usage group of the resource-usage groups that the application is assigned;
       apply, by the resource control tools to the application, the resource control policy of the identified resource-usage group that the application is assigned; and
       execute the application with the defined resource constraints, which correspond to the identified resource-usage group that the application is assigned, applied to the VM, the application executed on the VM with other applications having different owners than an owner of the application.

11. The system of claim 10, wherein the resources comprise at least one of CPU, memory, disk I/O, or network I/O.

12. The system of claim 10, wherein the plurality of resource control tools comprise at least one of a Linux™ Control Groups (cgroups) kernel resource usage tool, the disk storage control tool is a Linux™ Disk Quota disk storage control tool, a Linux™ Traffic Control (tc) network traffic control tool, or a Pluggable Authentication Module (PAM) limits module.

13. The system of claim 12, wherein applying the resource control policy of the identified resource-usage group of the application further comprises:
    placing files of the application in a specified location of a file system of the VM, the specified location configured by Disk Quota to control disk space of the application according to the resource constraints of the resource-usage group of the application; and
    placing an ID of a process of the application into a cgroup established for the application that implements the resource constraints of the resource-usage group of the application.

14. The system of claim 10, further comprising, for each of the resource-usage groups, creating a mapping in the VM of the resource-usage group to configurations of the one or more resource control tools that implement the resource control policy of the resource-usage group.

15. The system of claim 10, wherein the identifying the resource-usage group of the application further comprises:
    receiving a request to create the application from a server orchestration system, wherein the server orchestration system operates on a broker layer of a Platform-as-a-Service (PaaS) system that includes the VM, the PaaS system implemented in a cloud computing system; and
    determining the resource-usage group of the application based on identifying information of the application included in the request.

16. A non-transitory machine-readable storage medium including instructions that, when accessed by a processing device, cause the processing device to perform operations comprising:
    receiving, by a virtual machine (VM) executed by the processing device, identification of resource-usage groups that each define resource constraints to apply to applications;
    establishing a resource control policy on the VM for each of the identified resource-usage groups, the resource control policy to enforce the resource constraints of its associated resource-usage group;
    for each established resource control policy, configuring resource control tools of the VM to implement the resource control policy;
    receiving, by the VM, a request to initialize an application on the VM, the request comprising identifying information about the application;
    identifying, by the VM in view of the identifying information, a resource-usage group of the resource-usage groups that the application is assigned;
    applying, by the resource control tools to the application, the resource control policy of the identified resource-usage group that the application is assigned; and
    executing the application with the defined resource constraints, which correspond to the identified resource-usage group that the application is assigned, applied to the VM, the application executed on the VM with other applications having different owners than an owner of the application.

17. The non-transitory machine-readable storage medium of claim 16, wherein the resources comprise at least one of CPU, memory, disk I/O, or network I/O.

18. The non-transitory machine-readable storage medium of claim 16, wherein the plurality of resource control tools comprise at least one of a kernel resource usage tool, a disk storage control tool, or a network traffic control tool.

19. The non-transitory machine-readable storage medium of claim 18, wherein the kernel resource usage tool is Linux™ Control Groups (cgroups), the disk storage control tool is Linux™ Disk Quota, and the network traffic control tool is Linux™ Traffic Control (tc).

20. The non-transitory machine-readable storage medium of claim 16, wherein the identifying the resource-usage group of the application further comprises:
    receiving a request to create the application from a server orchestration system; and
    determining the resource-usage group of the application based on identifying information of the application included in the request.

\* \* \* \* \*